United States Patent [19]
Cameron-Johnson

[11] 3,711,043
[45] Jan. 16, 1973

[54] GROUNDWHEELS FOR AIRCRAFT

[75] Inventor: Alan Cameron-Johnson, St. Albans, England

[73] Assignee: Hawker Siddley Aviation Limited, Kingston-upon-Thames, Surrey, England

[22] Filed: Sept. 21, 1970

[21] Appl. No.: 73,871

[30] Foreign Application Priority Data

Oct. 13, 1969 Great Britain......................50,216/69

[52] U.S. Cl. .......................................244/50, 180/55
[51] Int. Cl. ...............................................B64c 25/00
[58] Field of Search................180/55; 244/50, 103 R

[56] References Cited

UNITED STATES PATENTS

2,869,662 1/1959 Koup.....................................180/55

Primary Examiner—Trygve M. Blix
Assistant Examiner—Paul E. Sauberer
Attorney—Dowell and Dowell

[57] ABSTRACT

An aircraft wheel drive unit has a fluid-pressure-operated motor housed within the wheel and two planetary gear stages housed in a gearbox outboard of the motor, the final drive being transmitted from a ring gear of the second gear stage, which is inboard of the first stage, to the wheel through an output drive quill coupled, through a disc-type clutch if desired, to a flanged final drive member bolted to the wheel. The gear box and the motor are supported from the wheel by a bearing assembly within the flanged final drive member and surrounding the inner end of the gearbox. The motor has a torque coupling to the end of the non-rotary wheel axle to prevent rotation of the motor stator and gearbox. Structural integrity is given to the wheel-supporting assembly by providing a structural connection from an extension of the motor body to a spider secured within the gearbox through a non-rotary planet gear cage of the second gear stage.

11 Claims, 3 Drawing Figures

GROUNDWHEELS FOR AIRCRAFT

This invention relates to groundwheels for aircraft, more particularly self-powered groundwheels.

The concept of a civil VTOL aircraft landing area from which tractors and other servicing vehicles are excluded because of the traffic density, gives rise to the need for a self-propelling capability on the part of the aircraft themselves. A further restriction imposed by the limited size of the landing area and the density of traffic, is the need to avoid the use of main thrust engines for maneuvering on the ground.

It is therefore an object of the invention to accept both these limitations by providing propulsion of an aircraft through its groundwheels.

According to the present invention, an aircraft groundwheel drive unit comprises a fluid-pressure-operated motor within the wheel and a planetary gear train axially outward of the motor through which the motor drive is transmitted to a flanged annular final driving member surrounding the inner end of the gear box and secured to the wheel, the gear box structure and motor body having a torque connection to the non-rotary axle of the wheel to prevent rotation but being supported by the rotary wheel in a bearing assembly within said flanged final driving member.

In the preferred construction, the planetary gear train comprises first and second planetary gear stages, and the second stage is inward of the first and has a non-rotary planet gear cage that is designed to form a structural element of the gearbox and unites the gear box structure to the motor body.

In the case of a strictly VTOL aircraft that will not perform landings at any significant forward speed, the drive motor may be in permanent driving connection with the wheel. But for an aircraft intended for occasional conventional landings a clutch to disconnect the drive may be incorporated between the gear train and said flanged final driving member.

Two constructions according to the invention are shown in detail, by way of example, in the accompanying drawings, in which.

Figure 1:
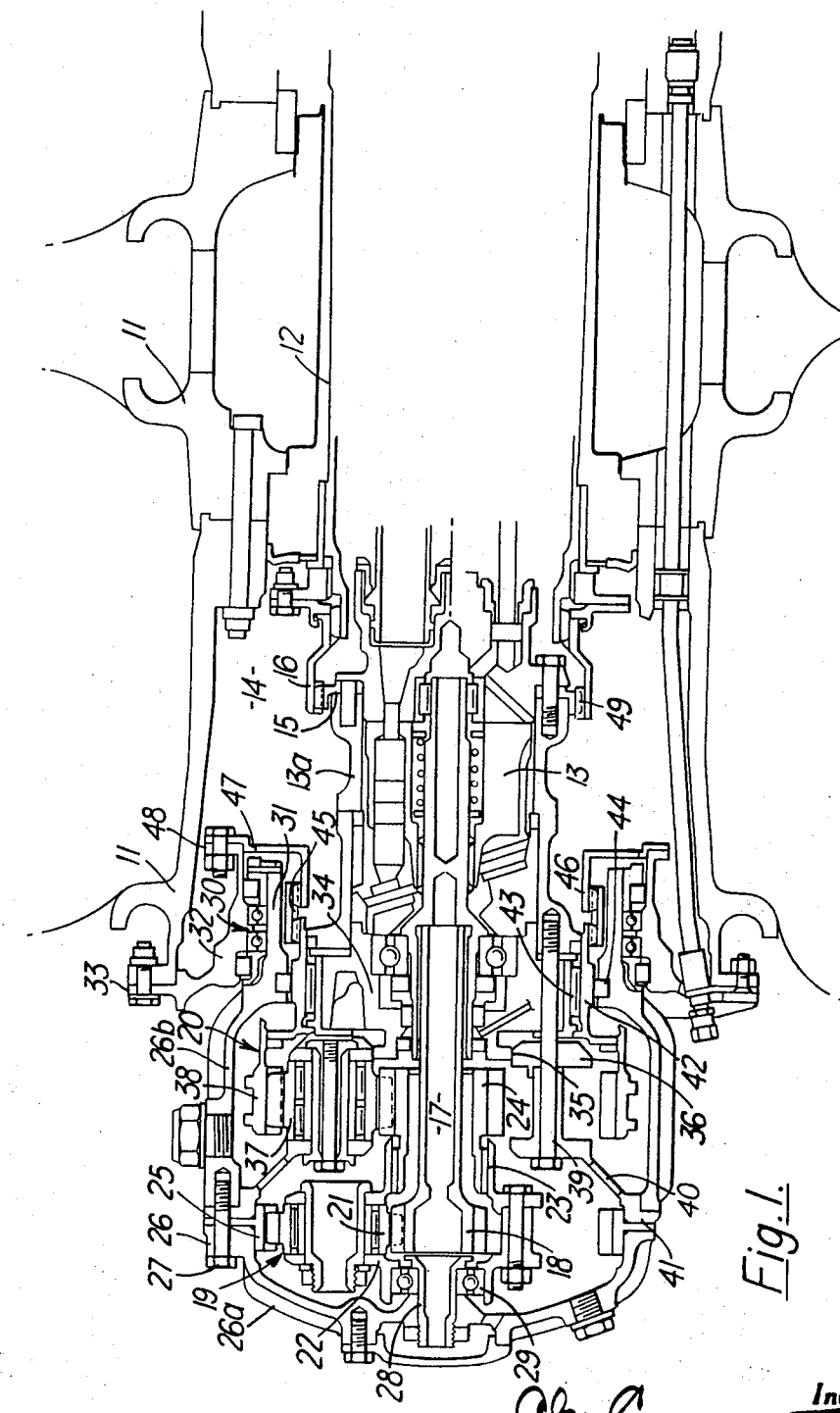
FIG. 1 shows the first construction in longitudinal section.

FIG. 1 shows a hollow three-part double-tired aircraft ground wheel 11 mounted for rotation around a non-rotary undercarriage axle 12. A swash plate type hydraulic motor 13 is disposed concentrically in a cavity 14 within the wheel beyond the end of the axle and has its stator or casing 13a coupled by a splined flange member 15 and a co-operating splined sleeve 16 to the end of the axle 12, the fluid lines to and from the motor 13 running inside the axle 12 to a supply and return system on the undercarriage leg. The motor output drive is delivered by a quill 17 coaxial with the wheel which extends outward away from the axle 12 and has at its outer end a pinion 18. From this pinion the drive is transmitted to the wheel 11 through a two-stage planetary gear assembly.

The pinion 18 constitutes the sun wheel of the first stage planetary gear 19 and is surrounded by three planet gears 21 mounted in a rotary cage 22. This cage is coupled at 23 to the sun wheel 24 of the second planetary stage 20 which is carried by the cage 22 and located around the quill 17 inward of the first stage 19. The planet gears 21 of the first stage are in mesh with a surrounding ring gear 25 that is fixed to the non-rotary housing 26 of the gear assembly. The gear housing 26 is in two parts 26a, 26b held together by bolts 27. The part 26a constitutes an end cover and is fitted with an axial spigot 28 carrying a bearing 29 for the gear cage 22. The part 26b constitutes the main body of the gear housing and extends axially inwards to enclose the inner second stage of planetary gearing 20 and the outer end of the motor 13. The inner end 31 of the gear housing part 26b is somewhat reduced in diameter and is received within a bearing assembly 30 carried in a sleeve 32 that lies within the outer end of the wheel 11. The sleeve 32 has a flange 33 at its outer end which is bolted to the end of the wheel 11 so that the wheel and the flanged sleeve 32 rotates as one.

The motor casing 13a has an outward axial extension 34 which provides a seating at 35 for the planet gear cage 36 of the second planetary gear stage 20. This cage is non-rotary and carries three planet gears 37 which mesh, on the one hand, with the sun wheel 24, and, on the other hand, with a surrounding rotary ring gear 38. The cage 36 is secured to the motor casing 13a by bolts 39, and it also has formed integrally thereon at its outward side a spider 40 with a peripheral flange 41 that is secured to the gear housing 26 by the bolts 27.

The output drive from the planetary gear assembly is taken from the ring gear 38. A large diameter quill 42 coupled to this ring gear extends axially inward therefrom through an annular gap between the motor casing extension 34 and the inner end of the gear housing 26 and is free to rotate in bearing assemblies 43, 44 on the motor casing and gear housing, respectively. The inner end of the quill 42 has a splined sleeve coupling at 45 to a flanged ring 46 the flange 47 of which extends radially out past the inner end 31 of the gear housing 26 and is bolted to a flange 48 on the inner end of the flanged sleeve 32. Thus, the drive from the motor 13 is transmitted via the quill 17 and the two planetary gear stages 19, 20, the quill 42 and flanged ring 46 and the flanged sleeve 32 to the wheel 11.

A feature of this arrangement is that although the assembly of gear box structure and motor body is non-rotary it is not supported by the non-rotary axle but instead in the bearing assembly 30 carried by the robust flanged rotary sleeve 32 bolted to the wheel and merely has a spline coupling to the axle through the motor body to prevent rotation. Since the only connection to the axle is by way of the splines 49 on the motor body and the loose sleeve 16, the whole assembly can be withdrawn from the wheel upon unbolting the external flange 33. This construction is made possible by the use of the non-rotary cage 36 of the second planetary gear stage 20 as a structural element of the gearbox, connecting the gearbox proper to the hydraulic motor casing 13a. The hydraulic connections within the axle are made before assembly of the drive unit to the wheel, utilizing telescopic sliding joints between rigid pipes and a central manifold to give pull-out access to the pipe unions.

The arrangement in FIG. 1 is intended for a VTOL aircraft having negligible forward speed on landing and where the requirements are for a permanently connected drive with the ability to accelerate the aircraft up to a taxiing speed not exceeding, say, 15 to 20 m.p.h. in a reasonably short time and to maintain headway against wind gusts and small gradients. Similar drive units are provided on all main undercarriage wheels and preferably on the nose wheels also since the weight distribution of a VTOL aircraft may give high nose loads and therefore good nose wheel traction. Each individual drive unit is of comparatively small diameter, i.e. less than the diameter of the wheel rim, and operates with reasonably high efficiency in both forward drive and reverse. A further advantage of the non-rotating gearbox arrangement is that, with the gearbox remaining in one attitude, the provision of filling and levelling plugs for the gear lubricant presents no problem.

Since there is no disconnection between the gear trains and the wheel, the mechanism will not tolerate a suddenly applied forward speed and the consequent high accelerations and velocities within the unit. For this reason, the design in FIG. 1 is restricted purely to vertical landing and take-off. This clearly imposes limitations, some of which will be unacceptable in certain instances. A landing with forward speed cannot be performed without destruction of the transmission system, but since the wheel is too small, in any case, to accommodate a brake other than for parking, there is no provision for conventional landing. Towing by tractor is limited since the backpressure imposed by the open-circuited hydraulic system could give a drag up to 15 percent of the driving tractive effort.

Figure 2:
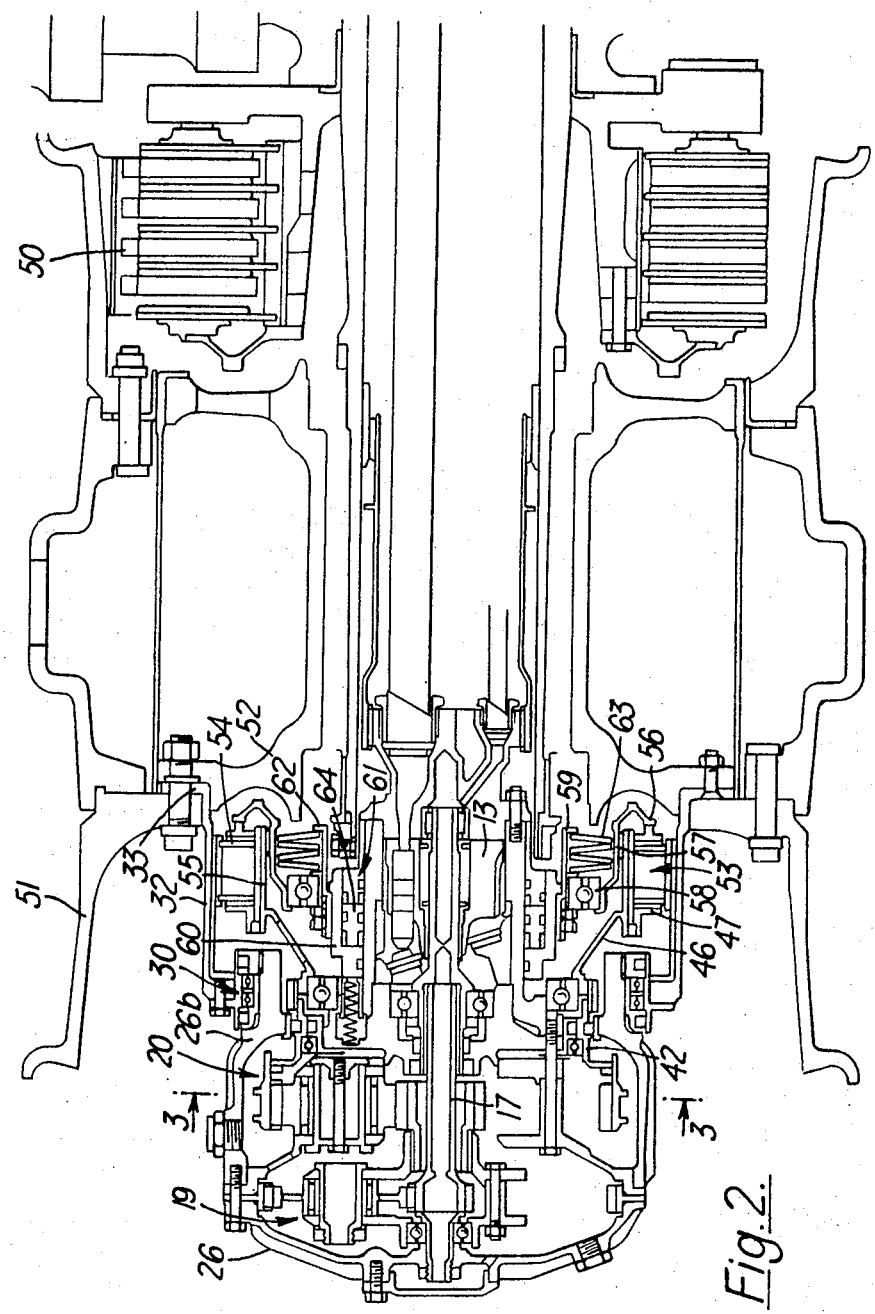
FIG. 2 is a corresponding view of the second construction.
Figure 3:
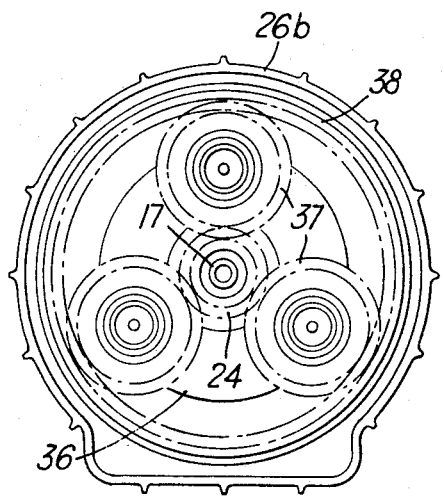
FIG. 3 is a view in section on the line 3—3 of FIG. 2.

FIGS. 2 and 3 show an arrangement generally similar to that of FIG. 1 but enlarged and modified to accept conventional landings with forward speed. The small tires, running at high deflection in FIG. 1, and the wheel diameters, have to be significantly increased for a conventional landing. The wheel brake 50 now required fits the wheel which has almost double the rim diameter. The enlarged size of wheel makes possible the inclusion of a hydraulically-applied clutch in the wheel drive transmission unit. The associated wheel tires will have adequate load capacity and speed capability for up to 200 kts.

The drive unit in FIGS. 2 and 3 is considerably smaller in diameter than the wheel rim 51 and largely contained within it. In this instance, the flange 33 whereby the final driving sleeve 32 is secured to the wheel is at the inner end of the sleeve, instead of the outer end as in FIG. 1, and is made small enough in diameter to permit the wheel rim 51 to be detached from the wheel hub 52 without disconnection of the drive unit. The bearing assembly 30 for the gear housing 26 is carried by the flanged sleeve 32 at its outer end.

The clutch 53 comprises an assembly of sliding clutch discs 54 carried, on the one hand, internally of the sleeve 32 intermediate its ends and, on the other hand, externally of an inward cylindrical extension 55 of the ring 46 that is coupled to the drive quill 42. The clutch is engaged by the pressing together of the clutch discs 54 between the flange 47 on the ring 46 and a flange 56 on the inner end of a clutch-operating sleeve 57. The clutch-operating sleeve is mounted for rotation on a thrust bearing 58 which surrounds a further sleeve 59 that in turn surrounds the axially-moving cylinder 60 of a clutch-actuating piston and cylinder assembly.

The cylinder 60 contains a non-moving annular piston 61 and a floating piston 64 arranged so that whichever of two fluid pressure ports of the motor 13 receives pressure fluid, for either forward or reverse drive, the cylinder member 60 is urged to the left as viewed in the drawing. When the cylinder 60 moves to the left it carries with it the sleeve 59, and a flange or shoulder 62 at the inner end of the sleeve 59 exerts a leftward force on the bearing 58 and clutch-operating sleeve 57, through the intermediary of spring discs 63, to cause the clutch to engage.

The clutch is normally disengaged, and permits high speed taxiing of the aircraft without reverse-driving the gear train. Engagement of the clutch is, as stated, due to application of hydraulic pressure to either port of the motor, and occurs at low pressure (about 6½ percent of normal motor pressure) to ensure engagement before the motor speeds up. The potentially high load due to full pressure, which would be excessive for the structure and thrust bearing, is relieved by the suitably preloaded disc springs 63.

Although emphasis has been laid on the VTOL case, it will be understood that the invention is not limited in application to this since there can be an advantage in having self-propulsion on conventional aircraft, particularly large ones operating on icy taxi-ways. Under these conditions, a tractor may not be able to obtain sufficient traction because of its low relative weight, when most of the weight is concentrated on the aircraft's main wheels. The second embodiment described herein would then be applicable.

I claim:

1. An aircraft ground wheel and drive unit assembly comprising: a hollow ground wheel mounted on a non-rotary undercarriage axle extending coaxially within said wheel, a fluid-pressure-operated rotary motor situated coaxially within said hollow wheel and including a motor rotor and a non-rotary motor casing, a non-rotary gear box situated axially outward of said wheel, a planetary gear train mounted within the gear box, a driving connection coupling said motor rotor and said planetary gear train, a flanged rotary annular final driving member surrounding the inner end of said gearbox and secured to said wheel, coupling means whereby said annular final driving member is driven by said planetary gear train, and a bearing assembly within said annular final driving member providing a mounting and support for said motor casing and said gearbox while permitting said final driving member to rotate relatively thereto, said gearbox and said motor casing having a torque-transmitting connection to said non-rotary axle to provide restraint against rotation.

2. An assembly according to claim 1, wherein the planetary gear train comprises first and second planetary gear stages, and the second stage is inward of the first and has a non-rotary planet gear cage that is designed to form a structural element of the gearbox and units the gear box structure to the motor casing.

3. An assembly according to claim 2, wherein a clutch to disconnect the drive is incorporated between the gear train and said flanged final driving member.

4. An assembly according to claim 3, wherein the motor is a hydraulic motor disposed concentrically in a cavity within the wheel beyond the end of the axle and has its casing prevented from rotation by a torque-transmitting coupling between the casing and the axle end, the fluid lines to and from the motor being led inside the axle, and the motor output being delivered to the planetary gear train by a coaxial quill extending outward away from the axle.

5. An assembly according to claim 4, wherein the motor output quill carries at its outer end a sun pinion of the first planetary gear stage which meshes with planet gears on a rotary planet gear cage that drives a sun pinion of the second gear stage surrounding the quill inward of the first, the planet gears on the rotary planet gear cage also being in mesh with a surrounding ring gear fixed within the gearbox.

6. An assembly according to claim 5, wherein the non-rotary planet gear cage of the second planetary gear stage is carried jointly by, on the inner side, an extension of the motor casing and, on the outer side, a radially-extending spider secured to the gearbox wall, and the output drive of the gearbox is provided by an output ring gear surrounding and in mesh with the planet gears on the non-rotary planet gear cage and an output drive quill which rotates with said output ring gear and extends inward coaxially with the motor casing extension which it surrounds.

7. An assembly according to claim 6, wherein said flanged final driving member has a flange at its outer end secured to the wheel and extends inward into the wheel around and beyond a reduced inner end portion of the gearbox, the bearing assembly supporting the gearbox and motor being disposed around said reduced inner end portion of the gearbox, and the drive to the wheel is transmitted from said gearbox output drive quill to the inner end of said flanged final driving member by means of a flanged sleeve coupled to the quill and extending inward coaxially within the gearbox inner end portion and around the motor casing.

8. An assembly according to claim 3, wherein the flanged final driving, member has a flange at its inner end secured to the wheel, said bearing assembly supporting the gearbox and motor is disposed at or near its outer end, and the clutch to disconnect the drive is disposed within said final driving member.

9. An assembly according to claim 6, wherein the clutch comprises discs or plates keyed for rotation with the final driving member, further co-operating discs or plates keyed for rotation with a sleeve member coupled to said gearbox output drive quill, and a fluid-pressure-operated piston-and-cylinder assembly arranged to engage the clutch discs whenever fluid pressure is admitted to the drive motor.

10. An assembly according to claim 9, wherein the fluid-pressure-operated clutch assembly comprises an annular cylinder surrounding the motor, with two pistons working therein in an arrangement such that the clutch is engaged irrespective of whether pressure fluid is admitted to the motor for forward or reverse drive.

11. An assembly according to claim 9, wherein the clutch-engaging effort is transmitted to the clutch discs through a preloaded spring assembly which prevents the application of a high load due to the full motor fluid pressure.

* * * * *